H. R. GEER.
FLUID PRESSURE CONTROLLING VALVE.
APPLICATION FILED MAR. 10, 1920.
1,425,086.
Patented Aug. 8, 1922.
2 SHEETS—SHEET 2.
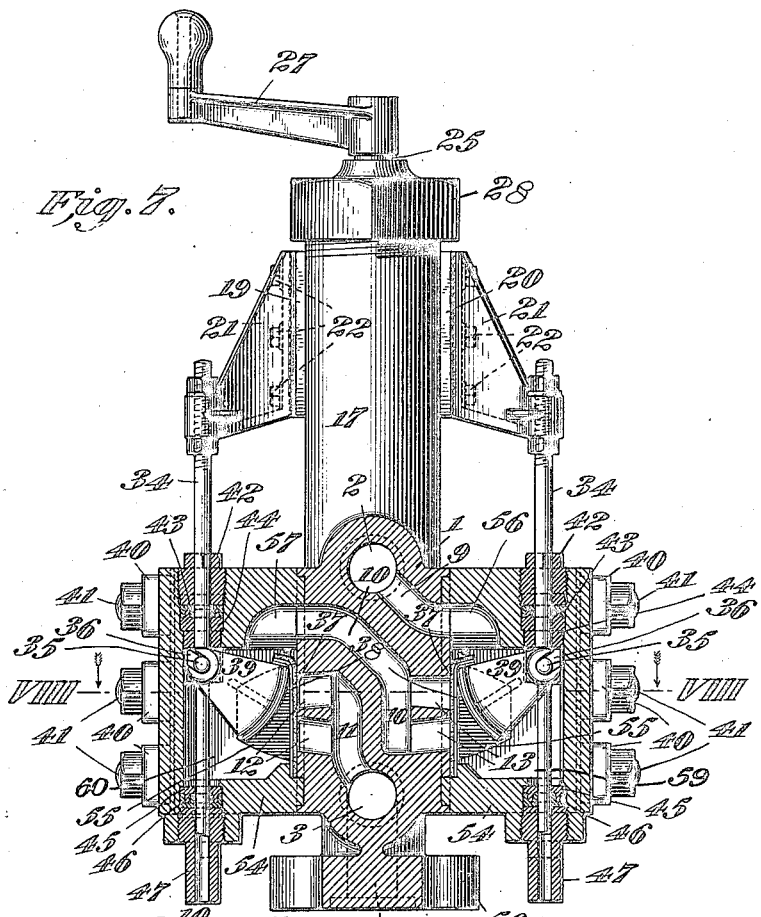
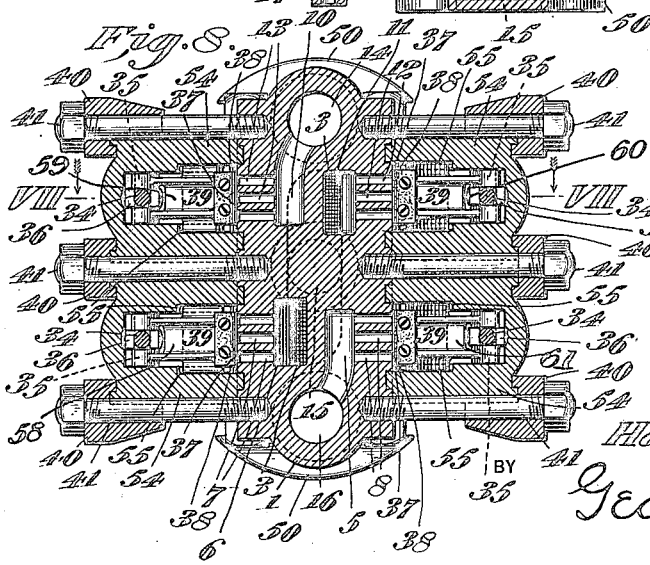
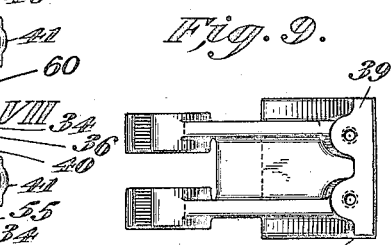
INVENTOR
Harry R. Geer.
BY
Geo. E. Thackray
ATTORNEY

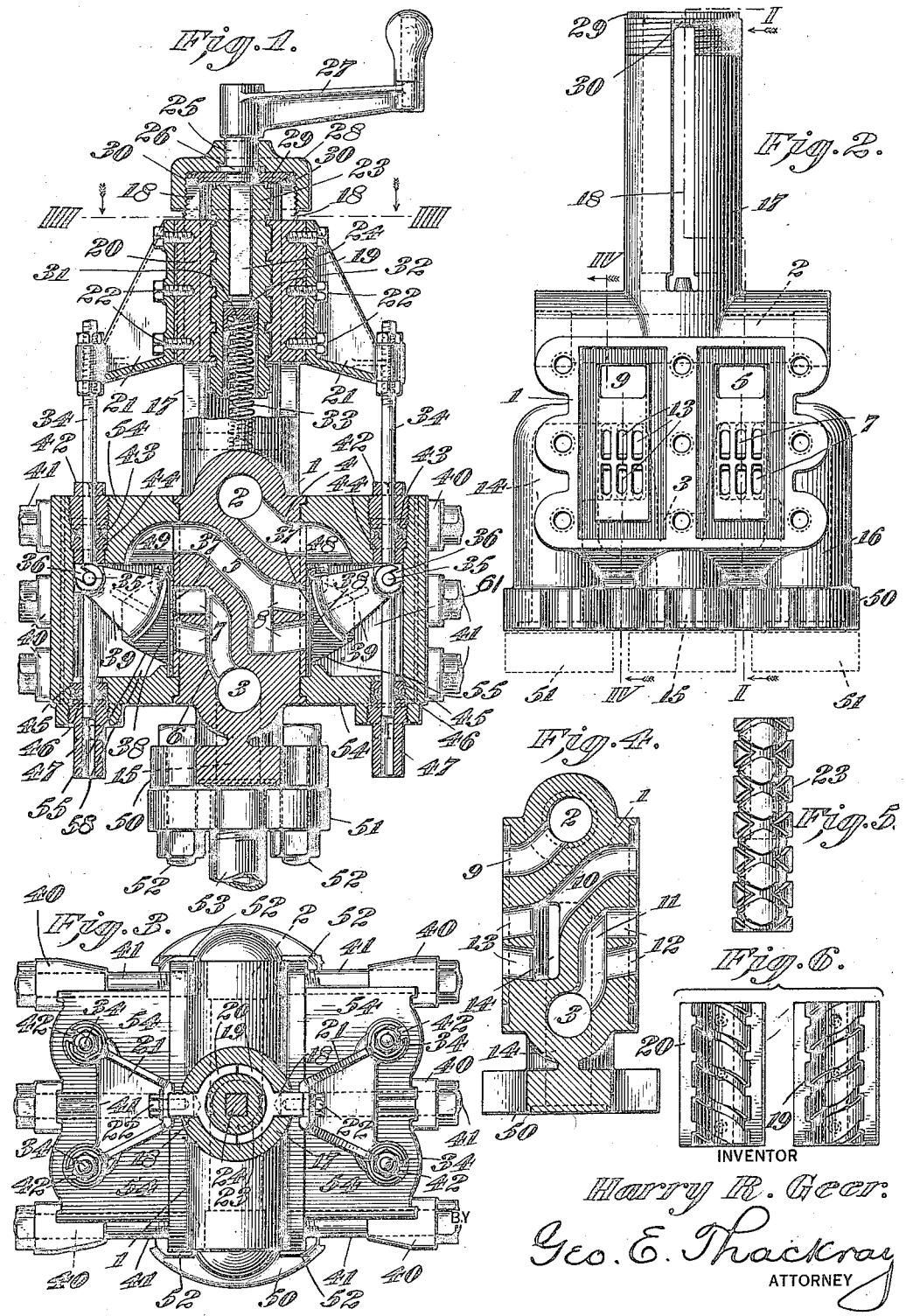

UNITED STATES PATENT OFFICE.

HARRY R. GEER, OF JOHNSTOWN, PENNSYLVANIA.

FLUID-PRESSURE-CONTROLLING VALVE.

1,425,086.  Specification of Letters Patent.  Patented Aug. 8, 1922.

Application filed March 10, 1920. Serial No. 364,629.

*To all whom it may concern:*

Be it known that I, HARRY R. GEER, a citizen of the United States, and a resident of the city of Johnstown, county of Cambria and State of Pennsylvania, have invented certain new and useful Improvements in Fluid-Pressure-Controlling Valves; and I do hereby declare the following to be a full, clear, and exact description of the invention, such as will enable others skilled in the art to which it appertains to make and use the same.

My invention relates to improvements in valves for controlling the flow of fluids, particularly under high pressures, and is especially adapted for use with presses for forging, punching, piercing, drawing, etc.

The general object of my invention is to provide a valve that will be free from the defects which exist in the valves heretofore available for use with high fluid-pressures, and I propose to eliminate these defects by providing a practical rolling rocker type valve that will eliminate the use of auxiliary apparatus, pilot valves, etc., thereby simplifying the control; have positive and rapid action; work with the minimum of physical and mental effort on the part of the operator; and provide ready access to all parts.

The construction which I employ for accomplishing the above objects consists of a suitably ported valve seat casing, to which the necessary piping is attached, provided with opposed flat faces in which the ports, two or more, are located. The valve chambers or boxes are bolted to these flat faces of the ported valve seat casing in such a manner that any one of them can be readily removed without disturbing the others.

The valves are of the rolling rocker type and are provided with forks to engage roller pins on the valve rods and are thus readily changed. Arc shaped guides in the valve chamber walls so confine the segmental valve rockers as to insure perfect rolling action and positively hold the rocker face against the valve port in the correct relation to the roller pin at all points in its travel.

The valve movement may be accomplished by a simple lever control, but for larger valves a screw-operated control is preferable as shown in the drawings, and to this end I propose a right and left-hand double screw-threaded shaft which engages two opposed segmental nuts, one having a right-hand thread and the other a left hand thread, to which the valve rod brackets are attached. The right and left-hand double screw-threaded shaft is free to move longitudinally on its axis, the travel being resisted by a spring or other pressure means. Rotation of this double screw-threaded shaft in either direction will cause the operative movement of a valve rod or rods, inasmuch as the valve rod or rods opposite to it is at the end of its upward travel. Consequently some of the valves are stationary during the movement of the other valves and vice-versa. As the double screw-threaded shaft is rotated, it feeds or screws down on one of the segmental nuts, which remains stationary during the operation, thereby compressing the spring and carrying with it the other segmental nut. At the same time the moving segmental nut with its valve rod or valve rods attached thereto travels down on the double screw-threaded shaft and opens the valves, its travel therefore being twice that of the double screw-threaded shaft, thereby securing quick action, but not so rapid as to produce shock or hammering in the pipes. The compression in the spring will automatically return the moving segmental nut and close the opened valves when the controlling handle is released, whereby all the valves normally remain closed.

The valves proposed will preferably be composed of flexible spring steel strips, on the contact face of which a layer of rubber is cemented or vulcanized, although leather or other materials individually or in combination may be used if desired.

Having thus given a general description of my invention, I will now, in order to make the same more clear, refer to the annexed two sheets of drawings, which form part of this specification, and in which like characters of reference indicate like parts.

Figure 1 is a longitudinal sectional elevation of my improved fluid pressure controlling valve taken on the line I—I of Figure 2, with parts broken away to more clearly show the general arrangement of the parts and operation of the valve; Figure 2 is a side elevation of the valve seat casing; Figure 3 is a transverse sectional elevation taken on the line III—III of Figure 1; Figure 4 is a vertical sectional elevation taken on the line IV—IV of Figure 2; Figure 5 is a side elevation of the right and left hand double screw-threaded shaft; Figure 6 is a detail elevation of the right and left-hand screw-threaded portions of the segmental nut; Figure 7 is a vertical sectional elevation taken on the line VII—VII of Figure 8, the section being on the same line but looking in the opposite direction to the section shown in Figure 4; Figure 8 is a transverse sectional elevation taken on the line VIII—VIII of Figure 7; and Figure 9 is a top plan view of one of the rocker valves.

Referring now to the characters of reference on the drawings:—The valve seat casing 1 is provided with opposed flat valve seat faces at its sides, an upper longitudinal passage 2 near its top, and a lower longitudinal passage 3 near the bottom thereof which has a central connecting outlet or exhaust passage 15. Castings 54 containing valve chambers are bolted to the valve seat casing 1 by means of cleats 40 and the bolts 41 and are therefore readily removable for access to the valves.

The valve seat casing 1 has the upper transverse passage 4 leading from the upper longitudinal passage 2 to the port 48 in one of the valve castings 54 in the valve chamber 61 at one side of the valve seat casing 1, an intermediate transverse passage 5 leading from the port 49 in another one of the valve chambers 58 on the other side of the valve seat casing to the valve ports 8 and also connecting with the angular passage 16 at one side of the valve seat casing, and a lower transverse passage 6 leading from the valve ports 7 to the lower longitudinal passage 3.

The valve seat casing 1 also has on its opposite side another similar set of ports and passages in which the upper transverse passage 9 leads from the upper longitudinal passage 2 to a port 56 in another one of the valve castings 54 to the valve chamber 59, an intermediate transverse passage 10 leading from one of the valve chambers 60 by the port 57 to the valve seat openings 13 and also connecting with the angular passage 14, and the lower transverse passage 11 leading from the valve ports 12 to the lower longitudinal passage 3.

The valve seat casing 1 has the cylindrical bearing guide 17 with two oppositely disposed slots 18 formed therein which receive and guide the longitudinal ribs of the two segmental nuts 19 and 20, one of which has a right-hand thread and the other a left-hand thread. The slots 18 form slideways for engaging the longitudinal ribs of the segmental nuts 19 and 20 and prevent any rotary motion of the latter, and brackets 21 are attached to the longitudinal ribs of the segmental nuts 19 and 20 by the cap screws 22.

A double right and left-hand screw-threaded shaft 23 has a central longitudinal hole extending through it, the upper part of which is square in cross-section and of smaller diameter than the lower portion, to receive the square lower portion 24 of the handle shaft 25, thus allowing a longitudinal sliding, but no rotary motion of the double screw-threaded shaft 23 on the square lower portion 24 of the handle shaft 25 as the latter is rotated by turning the valve operating handle 27 which has a square hole fitting the square upper end of the handle shaft 25.

A collar 26 is also formed on the handle shaft 25, which fits in a recess in a screw cap 28 screwed on the upper end of the cylindrical bearing guide 17, and a washer 29 having cleats 30 fastened thereto is mounted on top of the cylindrical bearing guide 17 within the screw cap 28, the said cleats 30 extending into the upper ends of the slots 18, the washer 29 forming a thrust bearing for engaging the collar 26 on the handle shaft 25.

The lower part of the central longitudinal hole through the double screw-threaded shaft 23 is of larger diameter than the upper portion and formed cylindrical to contain a compression spring 33 capped at the upper end by the spring cap 31, bearing on the disk 32, which latter in turn rests against the shoulder beneath the square part of the hole in the screw shaft 23. At the lower end the compression spring 33 sits over a central projection on the valve seat casing 1 at the bottom of the bearing guide 17.

The valve rods 34 are fastened to the brackets 21 and have formed thereon at an intermediate point near the center an enlarged portion 36, each having a roller pin 35 extending through the same, which engages the forked ends of the rocker valve 39. As clearly indicated in Figure 7 of the drawings, the lower portion of the valve rods 34 are preferably of smaller diameter than that of the upper portion and are subject to a static uplift to overcome gland friction, and by this means and the compression in the spring 33, self-closing is obtained.

Each rocker valve 39 has fastened to its upper side a spring strip 38 to which is cemented or vulcanized a rubber strip 37, the other end of the valve strip being retained by the recess in the valve housing when bolted to the valve casing. Each rocker valve 39 has two arms with forked ends at the radial center of the rocker, that engage the ends of the roller pins 35, which extend through the enlarged portion 36 of the valve rods 34. This construction, together with the arc-shaped guide recesses 55 in the sides of the valve chamber walls so confines the rocker valves 39 that perfect rolling action and positive valve action is assured at all times.

The gland construction for the upper ends of each of the valve rods 34 are shown as having an outer gland head 42, a packing ring or cup leather 43 and the inner gland head 44; and for the lower end an inner gland head 45, a packing ring or cup leather 46, and the outer gland head 47.

The bottom flange 50 of the valve seat casing 1 serves for connecting the pipes 53 by means of the lower connecting flange 51 and the bolts 52, thereby forming flanged joints.

The operation of this valve in connection with a double-acting pressure cylinder is as follows:

Assume the handle 27 turned clockwise looking down upon the valve, the parts being in position as shown in Figures 1, 7 and 8. It will be noted however that in Figure 7 the section is taken looking in the opposite direction to that shown in Figure 1, so that the parts shown on the right-hand side in Figure 1 will appear on the left-hand side of Figure 7. The right-hand threaded segmental nut 19 in Figure 1 being at its limiting position of up travel and restricted from rotary motion, cannot move. Therefore the right and left-hand double screw-threaded shaft 23 must travel downward compressing the spring 33 and carrying with it the left-hand screw-threaded segmental nut 20 which at the same time, because of the left-hand thread on the double screw-threaded shaft 23, must travel downward relatively to the double screw-threaded shaft 23. The two valve rods attached to the left-hand screw-threaded segmental nut 20 are thereby rapidly lowered thus opening the two valves on that side of the valve seat casing 1, the two valves on the other side of the valve seat casing to the right-hand screw-threaded segmental nut 19 remaining closed.

The flow of fluid is as follows:—The high pressure fluid supply line from the pumps and accumulators being connected with the valve seat casing 1 either at both ends of the longitudinal passage 2, or at one end and having the other end suitably closed by means of a plug. The fluid thus enters the upper longitudinal passage 2 and flows through the upper transverse passage 9, thence enters the rear left-hand valve chamber 59 through a port 56, thence it flows through the valve seat ports 13 into transverse passage 10 and into the angular outlet passage 14 and from there through one of the connecting pipes 53 to one end of the pressure cylinder, not shown.

In the meantime, exhaust fluid is coming from the other end of the pressure cylinder, this enters the valve seat casing 1 from the connecting pipe similar to 53 through the angular passage 16 on the other side of the valve casing, and flows through the intermediate transverse passage 5 to the port 49, where it enters the front left-hand valve chamber 58, from which it flows through the valve seat ports 7 into and through the lower transverse passage 6, thence into the lower longitudinal passage 3 and out through the connecting or exhaust passage 15.

When the handle is released, the compression in the spring 33 automatically closes the opened valves, the valve ports again being in position as shown in Figures 1, 7 and 8. Then by turning the handle 27 counter-clockwise, looking down upon the valve, the reverse operation of that heretofore described takes place, the valves on the opposite side of the valve seat casing whose rods 34 are attached to the right-hand screw-threaded segmental nut 19 being opened while the valves above described remain closed.

The flow in this case is as follows:—As before the fluid from the pumps and accumulators under high pressure enters the longitudinal port 2 and flows through the upper transverse passage 4, enters the right-hand front valve chamber 61 through the port 48, thence it flows through the valve seat ports 8 into the angular passage 5 and from there through 16 into the connecting pipe 53 to one end of the pressure cylinder, not shown.

Meanwhile exhaust fluid under low pressure returns from the other end of the pressure cylinder through the connecting pipe to the angular passage 14 and flows from there through the intermediate transverse passage 10 into the rear right-hand valve chamber 60 through a port 57, thence through the valve seat ports 12 into the lower transverse passage 11 and from there through the lower longitudinal passage 3 and then out through the connecting or exhaust passage 15.

Thus a complete cycle of the operation of this valve as used with a double-acting cylinder has been described, although it is manifestly evident that this valve may also be used to control a single-acting cylinder where the motive fluid is subject to exhaust by gravity.

The idea of my invention is to make a practical application of a flexible valve which is rolled over its seat instead of dragged or lifted and to embody more than one of such valves in an operating valve for the control of fluids in opposed directions, and furthermore to dispense with auxiliary operating devices and to substitute for the present laboriously operated valve, one that is more easily and simply handled. My valves operate noiselessly, smoothly and easily, as the fluid pressure does not affect to any extent the operation of the valves, and having no friction except at the bearings, the gland friction being taken care of as heretofore mentioned. Furthermore, the automatic closing of the valves is accomplished so as to eliminate shock or hammering in the pipes and because of its construction all parts are readily accessible for inspection and repair.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a fluid-pressure controlling valve, a valve seat casing, a valve box attached thereto, a rocker type valve therein, and means for operating said valve.

2. In a fluid-pressure controlling valve, a valve seat casing, a plurality of valve boxes attached thereto, a rocker type valve within each of the valve boxes, and means for operating said valves.

3. In a fluid-pressure controlling valve, a valve seat casing having fluid passages therein, valve seats on the outer faces of the valve seat casing, valve boxes attached to the valve seat casing over the valve seats, a rocker type valve within each of the valve boxes adapted to seat on the valve seats, and means for operating the valves.

4. In a fluid-pressure controlling valve, a valve seat casing having inlet and outlet fluid passages therein, valve seats on the said casing, valve boxes attached to the said casing over each valve seat, a rocker type valve within each of the valve boxes adapted to seat on the valve seats, and means for operating the valves.

5. In a fluid-pressure controlling valve, a valve seat casing having inlet and outlet fluid passages therein, valve seats on the valve seat casing adjacent each outlet or inlet passage, valve boxes attached to the casing over each seat, a rocker type valve mounted within each of the boxes adapted to seat on the valve seats, and means for controlling the movement of the valves.

6. In a fluid-pressure controlling valve, a valve seat casing provided with inlet and outlet ports, detachable valve boxes mounted over each of the ports, rocker valves mounted in sets adapted to control said ports within the valve boxes, and means for operating one set of rocker valves independent of the other set.

7. In a fluid-pressure controlling valve, a valve seat casing provided with inlet and outlet ports on each side thereof, detachable valve boxes mounted over each inlet and outlet port, rocker valves mounted in sets on each side of said casing, adapted to control the ports, and means for operating the set of rocker valves on one side, independent of the set of rocker valves on the other side.

8. In a fluid-pressure controlling valve, a valve seat casing, a plurality of passages and ports formed therein, a plurality of detachable valve boxes mounted thereon, each provided with interior arc shaped recesses, segmental rocker valves adapted to project into and be guided by the surfaces of said recesses, a flexible valve strip, one end of which is attached to each of said valves, and means whereby some of the rocker valves may be moved while the others remain stationary.

9. In a fluid pressure controlling valve, a valve body, a plurality of passages and ports therein, a plurality of detachable valve boxes mounted thereon, each provided with interior arc shaped recesses, segmental rocker valves adapted to project into and be guided by the surfaces of said recesses, forked bearings at the radial centers of each of said rocker valves, a flexible valve strip attached at one end to each rocker valve with its other end seated in a recess formed at the junction of the valve body and the valve boxes, and means whereby some of the rocker valves may be moved while the others remain stationary.

10. In a fluid-pressure controlling valve, a valve seat casing, a plurality of passages and ports formed therein, a plurality of detachable valve boxes therefor, opposed arc recesses therein, segmental rocker valves, with radially centered forked bearings, adapted to have their side edges project into and be guided by the surfaces of said recesses, flexible valve strips, one end of each of which is fixed and the other end fastened to the segmental rocker valves, valve rods each provided with a roller pin adapted to engage the forked ends of the rocker valves, and means for actuating some of the valve rods while the others remain stationary.

11. In a fluid-pressure controlling valve, a valve seat casing, a plurality of passages and ports formed therein, a plurality of detachable valve boxes therefor, opposed arc guide recesses therein, segmental rocker valves adapted to project into and be guided by the surfaces of said recesses, forked bearings at the radial center of said rocker valves, flexible valve strips for each rocker valve, one end of each of which is fastened to each of said rocker valves while the other end is held in a recess at the junction of the valve casing and the valve box, and a screw-operating mechanism whereby motion may be imparted to some of the rocker valves through the valve rods, each provided with a roller pin adapted to engage the forked ends of the rocker valves, whereby the flexible valve strips are rolled over and away from their respective ports.

12. In a fluid-pressure controlling valve, a valve seat casing provided with fluid passages and with inlet and outlet ports, a detachable valve box mounted over each port, a rocker type valve in each valve box adapted to control each port, a valve rod connected to each rocker type valve, a screw shaft with segmental nuts engaging therewith having a spring adapted to project the screw shaft in one direction, a controlling handle mounted on said screw shaft, a bracket attached to each of the valve rods and secured to longitudinal ribs formed on the segmental nuts working in slots in a tubular projection extending from the valve seat casing, whereby one set of valves may be moved while the other set remains stationary.

13. In a fluid-pressure controlling valve, a valve seat casing, a plurality of passages and ports therein, a plurality of detachable valve boxes therefor, rocker valves and rocker rods therein, a screw-operating mechanism comprising a right and left-hand threaded screw-shaft, a right-hand threaded segmental nut and a left-hand threaded segmental nut engaging said screw shaft, a control handle and shaft and a spring whereby some of the valves may be rolled away from the valve seats while the other remain stationary and the opened valves are automatically rolled back over the seats.

14. In a fluid-pressure controlling valve, a valve seat casing, a plurality of passages and ports therein, a plurality of detachable valve boxes therefor, a rocker valve within each of the detachable valve boxes, a valve rod connected to each of the rocker valves with its outer end attached to a reciprocating bracket secured to a segmental nut mounted in slideways formed in a tubular extension of the valve seat casing, a screw-operating means comprising a double right and left-hand screw threaded shaft, segmental nuts adapted to engage the said screw-threaded shaft and attached to the reciprocating brackets, a spring adapted to project the screw-threaded shaft in one direction, an operating handle having a shaft extending into the said screw-threaded shaft upon which said screw-threaded shaft is slidably mounted, whereby when the operating handle is rotated in either direction the screw-threaded shaft is adapted to give longitudinal motion to one of the segmental nuts and the valve rods attached thereto, while the other segmental nut and valve rods remain fixed, and means for automatically closing the valves.

15. In a fluid pressure controlling valve, a valve seat casing, a plurality of passages and ports therein, a plurality of detachable valve boxes therefor, opposed arc-shaped recesses therein, segmental rocker valves with radially centered forked bearings, adapted to have their side edges project into and be guided by the surfaces of said recesses, a flexible valve strip secured to each of said valves, one end of which is fixed and the other end fastened to the valve, valve rods one end of each of which is of greater diameter than the other and each provided with a roller pin adapted to engage the forked end of a rocker valve, means for actuating some of the valve rods and valves while the other remain stationary, and means for automatically closing all of the valves.

In witness whereof I hereunto affix my signature.

HARRY R. GEER.